United States Patent
Nakabayashi (10) Patent No.: US 8,515,263 B2
(45) Date of Patent: Aug. 20, 2013

(54) CONTENTS REPRODUCTION APPARATUS

(75) Inventor: Kotaro Nakabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 366 days.

(21) Appl. No.: 12/785,863

(22) Filed: May 24, 2010

(65) Prior Publication Data

US 2010/0303451 A1 Dec. 2, 2010

(30) Foreign Application Priority Data

May 26, 2009 (JP) ................... 2009-127078

(51) Int. Cl.
*H04N 5/928* (2006.01)

(52) U.S. Cl.
USPC ........................................ 386/338

(58) Field of Classification Search
None
See application file for complete search history.

(56) References Cited

U.S. PATENT DOCUMENTS

2007/0124780 A1* 5/2007 Lee .................................. 725/89

FOREIGN PATENT DOCUMENTS

JP 2008-193215 A 8/2008

OTHER PUBLICATIONS

Yamaha Corporation of America, "RX-V/RX-Z/RX-N Series, AV Receivers from Yamaha Electronics" retrieved via the Internet on Apr. 11, 2010 at URL: http://www.yamaha.com/yec/products/productdetail.html?CNTID=558249&CTID=5000300.
Japanese Office Action mailed May 7, 2013 and English language translation thereof.

* cited by examiner

*Primary Examiner* — Huy T Nguyen
(74) *Attorney, Agent, or Firm* — Crowell & Moring LLP (57) ABSTRACT

A contents reproduction apparatus (e.g. an AV receiver) is connectable to various sources (e.g. audio/video devices) having audio/video contents which are related to predetermined activities (e.g. Listen, Watch, Play) and predetermined sound field options (e.g. Music, Movie, Entertainment) via a sound field table describing a plurality of sound field modes. The contents reproduction apparatus allows the user to arbitrarily select the source, the activity, and the sound field option, thus determining a desired sound field mode via the sound field table. The desired sound field mode is adopted in the signal processing performed on the output signals (e.g. audio signals) of the selected source. Thus, the user is able to select the optimum sound field mode from among various sound field modes with a simple operation without needing to carry out troublesome and complicated operations.

3 Claims, 7 Drawing Sheets

ACTIVITY TABLE

|  | Listen | Watch | Play |
|---|---|---|---|
| STB | – | O | – |
| DVD | O | O | – |
| Game | – | – | O |
| Tuner | O | – | – |
| PC | O | O | O |
| USB | O | – | O |
| iPod | O | O | – |

FIG. 4

SOUND FIELD TABLE

|  | Music | Movie | Entertainment |
|---|---|---|---|
| Watch | SOUND FIELD 1<br>Music Video | SOUND FIELD 2<br>Movie_1 | SOUND FIELD 3<br>Sports |
| Listen | SOUND FIELD 4<br>Jazz Club | SOUND FIELD 5<br>Movie_2 | SOUND FIELD 3<br>Sports |
| Play | SOUND FIELD 6<br>Hall_A | SOUND FIELD 2<br>Movie_1 | SOUND FIELD 7<br>Action Game |

CONTENTS REPRODUCTION APPARATUS

BACKGROUND OF THE INVENTION

1. Field of the Invention

The present invention relates to contents reproduction apparatuses, and in particular to audio-video (AV) receivers which are able to perform a variety of signal processings implementing desired sound fields on audio signals.

The present application claims priority on Japanese Patent Application No. 2009-127078 (Filing Date: May 26, 2009), the content of which is incorporated herein by reference.

2. Description of the Related Art

Custom installation has been widely implemented to configure a desired AV system upon arbitrarily combining AV devices. AV receivers (see Non-Patent Document 1) implementing custom installation allow users to freely select and reproduce desired ones from among various audio-video contents upon connecting various audio-video sources.

AV receivers recently introduced employ various audio-video sources such as portable audio players (e.g. "iPod", a registered trademark), USB memory, personal computers (including hard-disk drives), and other storage devices storing large amounts of multiple-type contents in addition to conventional set-top boxes (STB), DVD players, and videocassette recorders (VCR). For this reason, they are able to reproduce various types of contents such as audio contents, video contents, photo-album contents, and game contents.

Non-Patent Document 1: Yamaha Corporation of America, "RX-V/RX-Z/RX-N Series, AV Receivers from Yamaha Electronics" retrievable via the Internet at URL: http://www.yamaha.com/yec/products/productdetail.html?CNTID=558249&CTID=5000300

AV receivers are designed to perform the signal processing implementing preferable sound fields on audio signals of reproduced contents, wherein it is preferable to perform the optimum signal processing suited to the type of reproduced contents. Preferably, AV receivers carry a capability of changing the setting of signal processing in conformity with user preference or the type of contents. For this reason, it is necessary to diversify the setting of signal processing in AV receivers under consideration of diversifications of reproduced contents.

Users may need to select the specifics of the signal processing (e.g. signal processing modes) in light of user preference and the desired type of reproduced contents. However, users may be confused how to select a desired one of numerous signal processing modes installed in AV receivers, wherein AV receivers need to explicitly illustrate differences between signal processing modes with detailed explanations, which require complicated presentations and indications. For this reason, users need to carry out troublesome and complicated operations, resulting in listening to audio contents in inferior sound fields far from optimum listening conditions.

SUMMARY OF THE INVENTION

It is an object of the present invention to provide a contents reproduction apparatus which is able to reproduce multiple-type contents and which allows the user to arbitrarily select the setting of signal processing implementing an optimum sound field with respect to reproduced contents.

A contents reproduction apparatus of the present invention is connectable to a plurality of sources (e.g. audio/video devices, game devices, intelligent devices) having different contents (e.g. video contents, audio contents, game contents) which are related to predetermined activities (e.g. Listen, Watch, Play) and predetermined sound field options (e.g. Music, Movie, Entertainment) via a sound field table describing a plurality of sound field modes. The contents reproduction apparatus allows the user to arbitrarily select the source, the activity, and the sound field option, thus determining a desired sound field mode via the sound field table. The desired sound field mode is adopted in the signal processing performed on the output signals (e.g. audio signals) of the selected source.

Specifically, an activity select menu is displayed to allow the user to arbitrarily select the activity from among the predetermined activities; a device select menu is displayed to allow the user to arbitrarily select the source from among the sources; and a contents select menu is displayed to allow the user to arbitrarily select the contents from among the contents of the sources. Alternatively, a sound field select menu is displayed to allow the user to directly select the desired sound field mode.

In the above, the number of predetermined activities and the number of predetermined sound field options are each smaller than the number of sound field modes which are ascribed to different scenes of audio reproduction.

Even when the user selects the same sound field option, the contents reproduction apparatus adaptively changes the sound field mode of the signal processing in conformity with the reproduced contents. This allows the user to select the optimum sound field mode from among a variety of sound field modes with a simple operation without needing to carry out troublesome and complicated operations.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
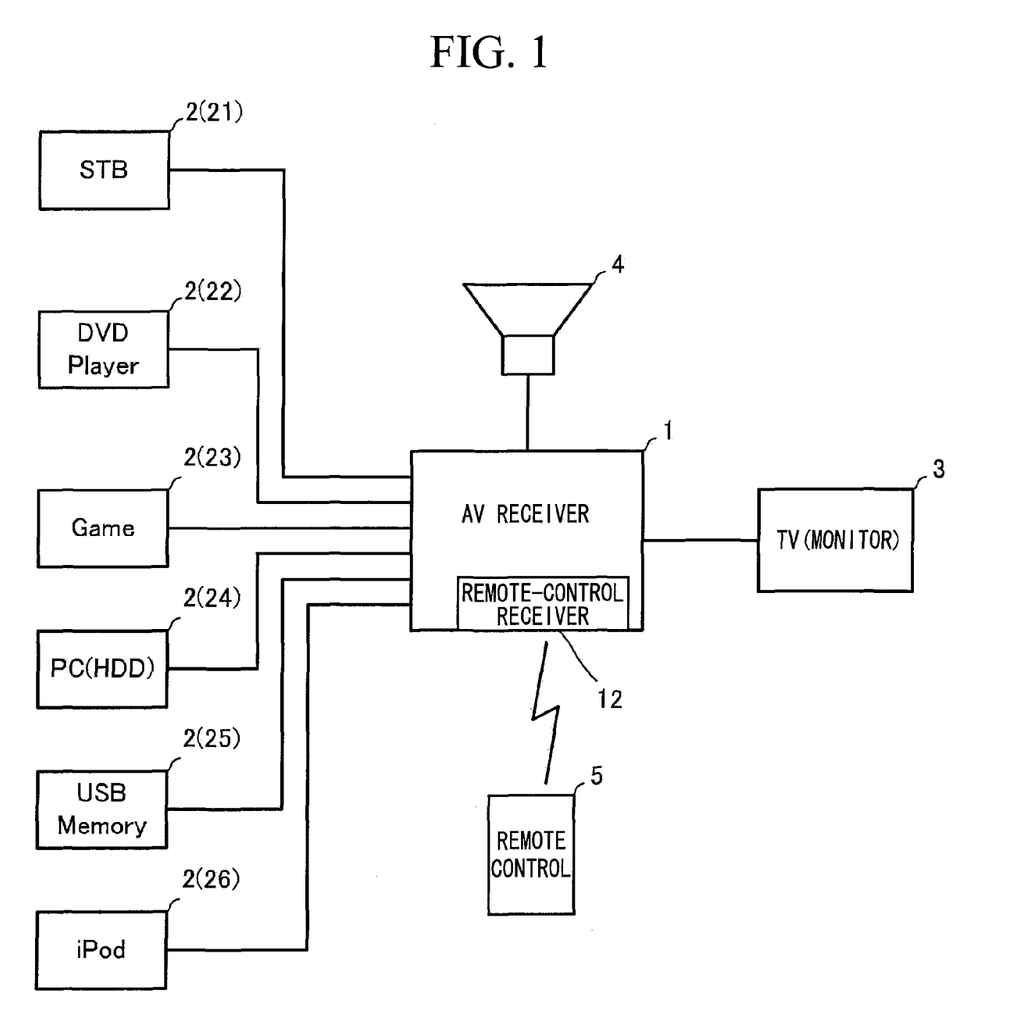
FIG. 1 is a block diagram showing the constitution of an AV system including an AV receiver according to the preferred embodiment of the present invention.

FIG. 1 is a block diagram showing the constitution of an AV system including an AV receiver 1 according to the preferred embodiment of the present invention. The AV system implementing custom installation is configured to connect a plurality of sources (or devices) 2, a television monitor (TV) 3, and a speaker 4 with the AV receiver 1.

The AV receiver 1 implements a select function selecting one source from among the sources 2, an audio-amplifier function amplifying an audio signal of the selected source 2 and outputting it to the speaker 4, a repeater function repeating a video signal of the source 2 toward a downlink device (e.g. the TV 3), a tuner function receiving a radio broadcast signal from an FM radio station and the like, and a commander function controlling the source 2 and the TV 3 upon user's operation.

As the sources 2 each serving as an uplink device connected to the AV receiver 1, there are a set-top box (STB) 21, a DVD player 22, a game device 23, a personal computer (PC) 24 including a hard-disk driver (HDD), a USB (Universal Serial Bus) memory 25, and an iPod 26. STB 21 includes a reproduction unit reproducing a television broadcast signal via a cable or a satellite. The DVD player 22 includes a reproduction unit reproducing audio/video signals recorded on a disk inserted therein. The game device 23 includes a reproduction unit reproducing audio/video signals of games recorded on media such as a DVD inserted therein. The PC 24 includes a storage unit (e.g. HDD) storing audio contents and video contents as well as a reproduction unit reproducing these contents. The USB memory 25 has a storage unit storing various contents such as audio contents. The iPOD 26 includes a storage unit (e.g. HDD or flash memory) storing audio contents and video contents as well as a reproduction unit reproducing these contents.

The TV 3 serving as a downlink device connected to the AV receiver 1 is primarily used as a monitor displaying video images given from the AV receiver 1.

The AV receiver 1 includes a remote-control receiver 12 receiving an infrared remote-control signal output from a remote-control unit 5.

Figure 2:
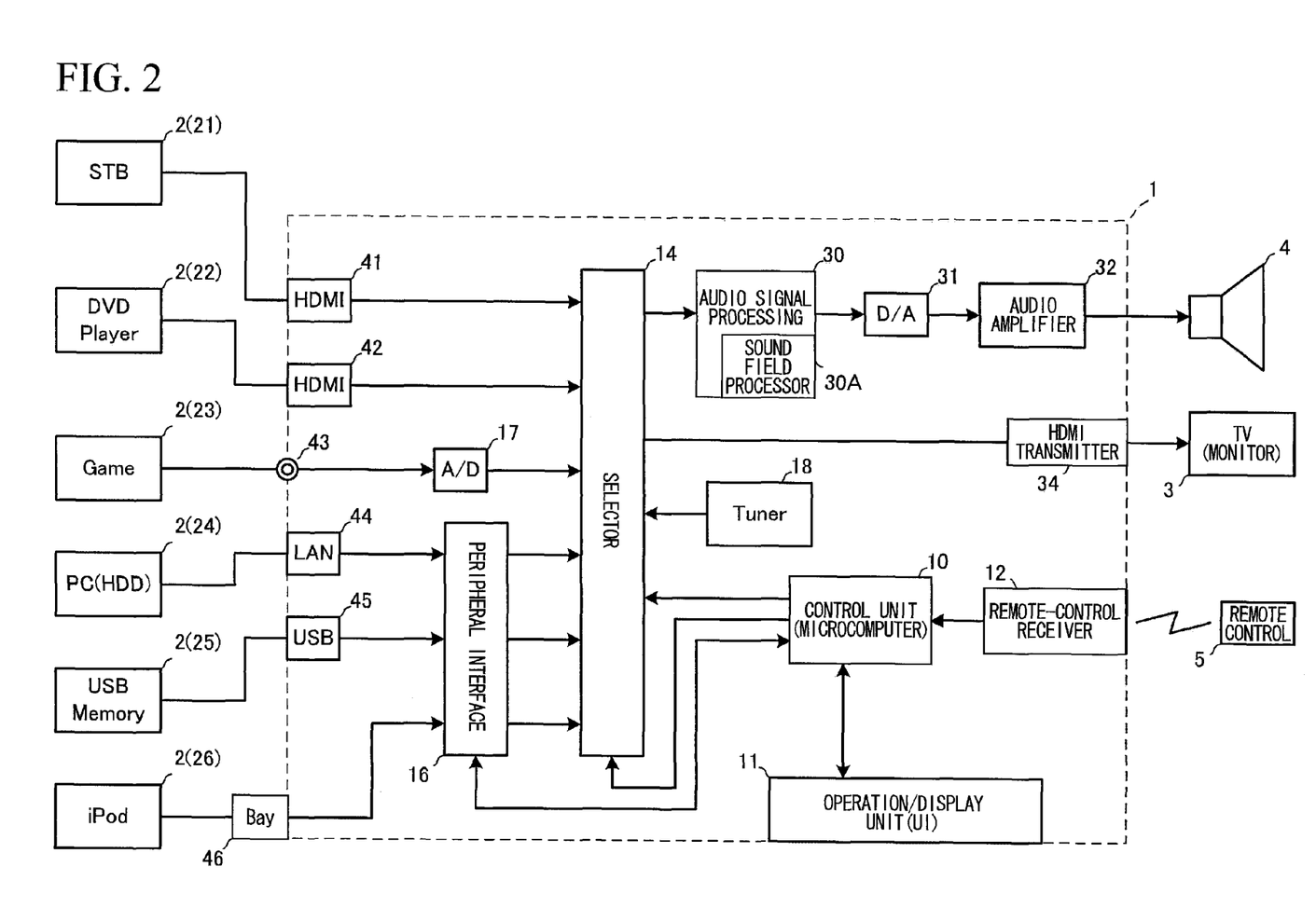
FIG. 2 is a block diagram showing the internal constitution of the AV receiver.

FIG. 2 is a block diagram showing the internal constitution of the AV receiver 1. A plurality of connectors connectable to the sources 2 are formed on the rear face of the AV receiver 1, such as HDMI (High-Definition Multimedia Interface) connectors 41, 42, an analog connector 43, a LAN (Local Area Network) connector 44, a USB connector 45, and an iPod-specified connector (or a bay) 46. Each connector may include the physical-layer circuitry serving as a transceiver and the like.

The STB 21 and the DVD player 22 are connected to the HDMI connectors 41 and 42 respectively. The game device 23 is connected to the analog connector 43. The PC 24 is connected to the LAN connector 44 via a LAN (not shown). The USB memory 25 is connected to the USB connector 45. The iPod 26 is connected to the iPod-specified connector 46. The combination between connectors and sources is not necessarily limited to the illustration of the present embodiment.

The HDMI connectors 41, 42 are directly connected to a selector 14. The analog connector 43 is connected to the selector 14 via an A/D converter 17. The LAN connector 44, the USB connector 45, and the iPod-specified connector 46 are connected to the selector 14 via a peripheral interface 16. A tuner 18 (serving as a built-in source) and a control unit 10 are connected to the selector 14. The tuner 18 is a reception/reproduction unit receiving and reproducing a broadcast audio signal from an FM broadcast station and the like. The control unit 10 is configured of a microcomputer implementing a communication function communicating with the PC 24 and the iPod 26, a switching function switching the selector 14, and a display function displaying an operational sequence diagram (DSD) such as operational guidance messages and wizard settings, wherein it serves as a source upon displaying OSD.

The control unit 10 switches over the selector in response to switching operations made by the remote-control unit 5 and/or an operation/display unit (or a user interface, UI) 11, thus selecting the sources 2.

The selector 14 inputs audio-video signals (i.e. video signals including audio signals), audio signals, and vide signals. The selector 14 delivers audio signals of the selected source 2 to an audio signal processing unit 30 while delivering video signals of the selected source 2 to a HDMI transmitter 34. The HDMI transmitter 34 is connected to the TV 3 via a HDMI cable.

An audio signal processing unit 30 includes a sound field processor 30A which performs the sound field processing on an audio signal input thereto. The sound field processing adds an echo or reverb of a virtual space to an audio signal via the signal processing. The sound field processor 30A is able to handle seven sound field modes, namely a sound field 1 (Music Video), a sound field 2 (Movie__1), a sound field 3 (Sports), a sound field 4 (Jazz Club), a sound field 5 (Movie__2), a sound field 6 (Hall_A), and a sound field 7 (Action Game). The audio signal processing unit 30 and the sound field processor 30A selects one of seven sound field modes so as to perform the corresponding sound field processing on an input audio signal in response to an instruction from the control unit 10.

An audio signal is subjected to the other signal processing such as equalization and sound quality control in addition to the sound field processing and is then converted into an analog signal via a D/A converter 31. An audio amplifier 32 amplifies the analog signal, which is subsequently supplied to the speaker 4. When the audio amplifier 32 is configured of a digital amplifier, the D/A converter 31 is configured of the circuitry converting PCM codes of audio signals into PWM signals.

The remote-control unit 5 has a power button turning on/off power to the AV receiver 1, cursor buttons moving a cursor on screen, and an enter button. When the user presses any one of buttons, the remote-control unit 5 outputs an infrared remote-control signal representing a command code assigned to the pressed button. The AV receiver 1 is equipped with the remote-control receiver 12 receiving the infrared remote-control signal output from the remote-control unit 5. Upon receiving the remote-control signal output from the remote-control unit 5, the remote-control receiver 12 analyzes the command code and outputs it to the control unit 10. Based on the command code, the control unit 10 switches over the OSD screen displayed on the TV 3 or switches over the selector 14.

Next, classifications of contents and user selecting procedures will be described with respect to the AV receiver 1. The AV receiver 1 classifies contents into three types of contents, namely "Listen", "Watch", and "Play". "Listen" designates audio contents amused by listening via ears; "Watch" designates video contents amused by watching with eyes; and "Play" designates game contents or photo-album contents (or photo pictures) which the user amuses by operating tools. The above three types of contents, i.e. Listen, Watch, and Play, are referred to as activities in the AV receiver 1.

Figure 3:
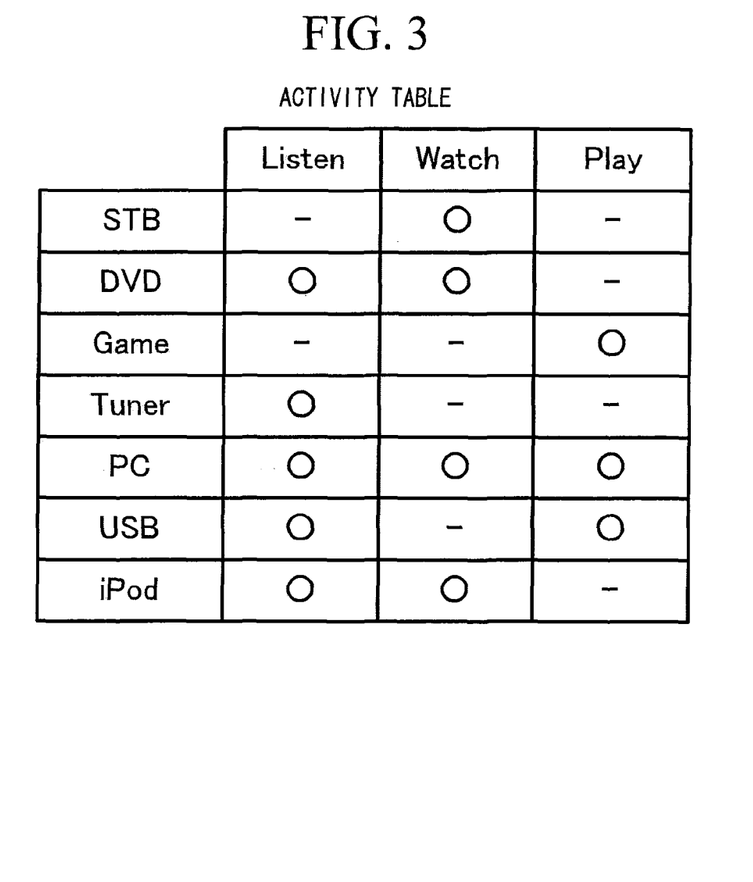
FIG. 3 shows an activity table stored in a control unit of the AV receiver.

FIG. 3 shows an activity table stored in the control unit 10 of the AV receiver 1. The activity table of FIG. 3 describes the classification of activities reproducible via the sources 2. According to the activity table, the STB 21 receiving television broadcastings such as cable-television broadcasting and satellite broadcasting is allowed to reproduce only the Watch activity. The DVD player 22 is allowed to reproduce the Watch activity and the Listen activity, wherein it is able to reproduce both the video contents (Watch) such as movies via DVD and the music contents (Listen) via CD. The game device 23 is allowed to reproduce only the game contents (Watch), and the tuner 18 is allowed to reproduce only the audio contents (Listen). The PC 24 whose hard-disk drive (HDD) is able to store all types of contents such as moving pictures, music pieces, and images is allowed to reproduce all of the Listen, Watch, and Play activities. The USB memory 25 is allowed to reproduce both of the music contents (Listen) and still pictures (Play). The iPod 26 is allowed to reproduce both of the music contents (Listen) and moving pictures (Watch).

The assignment of activities to the sources 2 can be stored in the activity table in advance, or it can be set by the user when connecting the sources 2 to the AV receiver 1.

Upon reproducing the contents (or upon selecting the reproduced contents), the user needs to select a desired activity. The AV receiver 1 selects the sources 2, which are allowed to reproduce the selected activity, and displays their identifications on the TV 3 with reference to the activity table. This enables the user to select desired one of the sources 2 displayed on the TV 3. The AV receiver 1 selectively displays the preferred contents corresponding to the selected activity from among the contents reproducible via the selected source 2 (or the contents stored in the selected source 2) on the TV 3. When the user chooses desired one of the displayed contents, the AV receiver 1 controls the source 2 to reproduce it.

Figure 4:
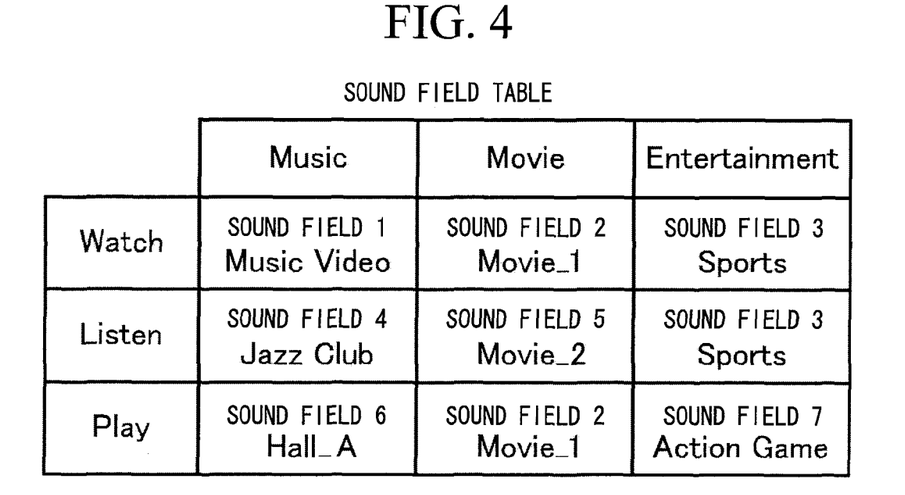
FIG. 4 shows a sound field option table stored in the control unit of the AV receiver.

FIG. 4 shows a sound field table describing sound field modes to be selected in light of the sound field selected by the user and the reproduced activity. The sound field processor 30A handles the sound field processing in each of the seven modes, namely the sound field 1 to the sound field 7. The AV receiver 1 provides the user with three sound field options (namely, "Music", "Movie", and "Entertainment"). Any one of the sound field 1 to the sound field 7 is selected in response to the sound field option selected by the user and the type of the reproduced contents (i.e. the Watch, Listen, and Play activities).

Figure 5:
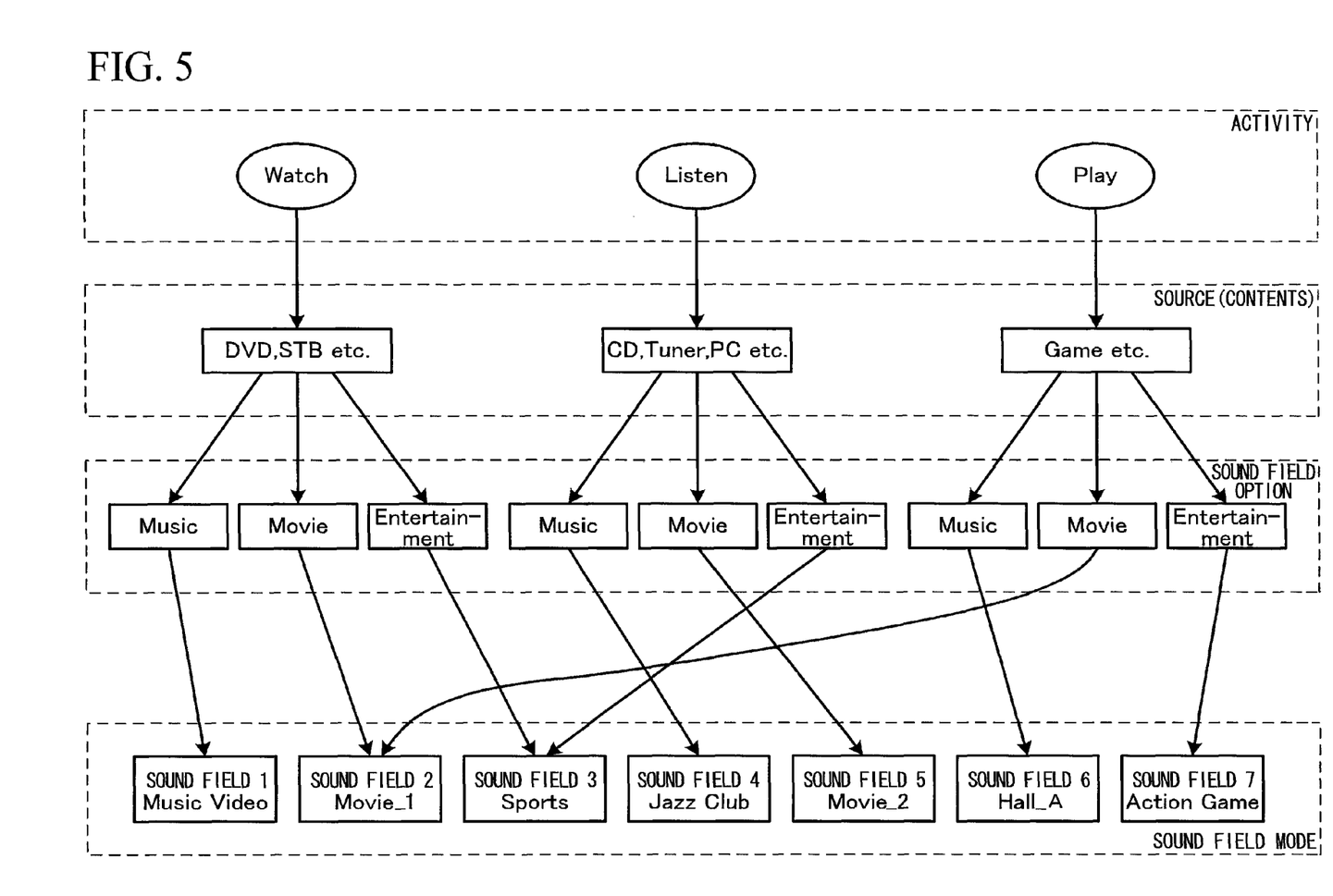
FIG. 5 shows a sound field selecting sequence implemented via the AV receiver.

FIG. 5 shows a sound field selecting sequence with reference to the sound field table of FIG. 4. Upon reproducing the contents, the user needs to select the activity (i.e. Watch, Listen, Play); subsequently, the contents belonging to the selected activity is being selected and reproduced. Before or after selecting the contents, the user needs to designate one of sound field options (i.e. Music, Movie, Entertainment). Based on the designated sound field option and the selected activity of the reproduced contents, a preferred sound field mode (i.e. one of the sound field 1 to sound field 7) is determined and set to the sound field processor 30A.

That is, the AV receiver simply requires the user to select one of three sound field options (i.e. Music, Movie, Entertainment), thus automatically designating a preferred sound field mode in light of the reproduced contents.

With respect to the reproduction of the same music, the preferred sound field mode may slightly differ in response to different activities such as the Watch activity in which the music is reproduced along with the video of a DVD and the Listen activity in which only the music is reproduced via a CD. The AV receiver 1 provides the user with various sound field modes (e.g. the sound field 1 in the case of the reproduction of DVD and the sound field 4 in the case of the reproduction of CD) suited to different activities when the user selects the sound field option of Music. That is, the AV receiver 1 presents the small number of options, allowing the user to easily choose desired one, thus achieving the fine sound field processing.

Figure 6:
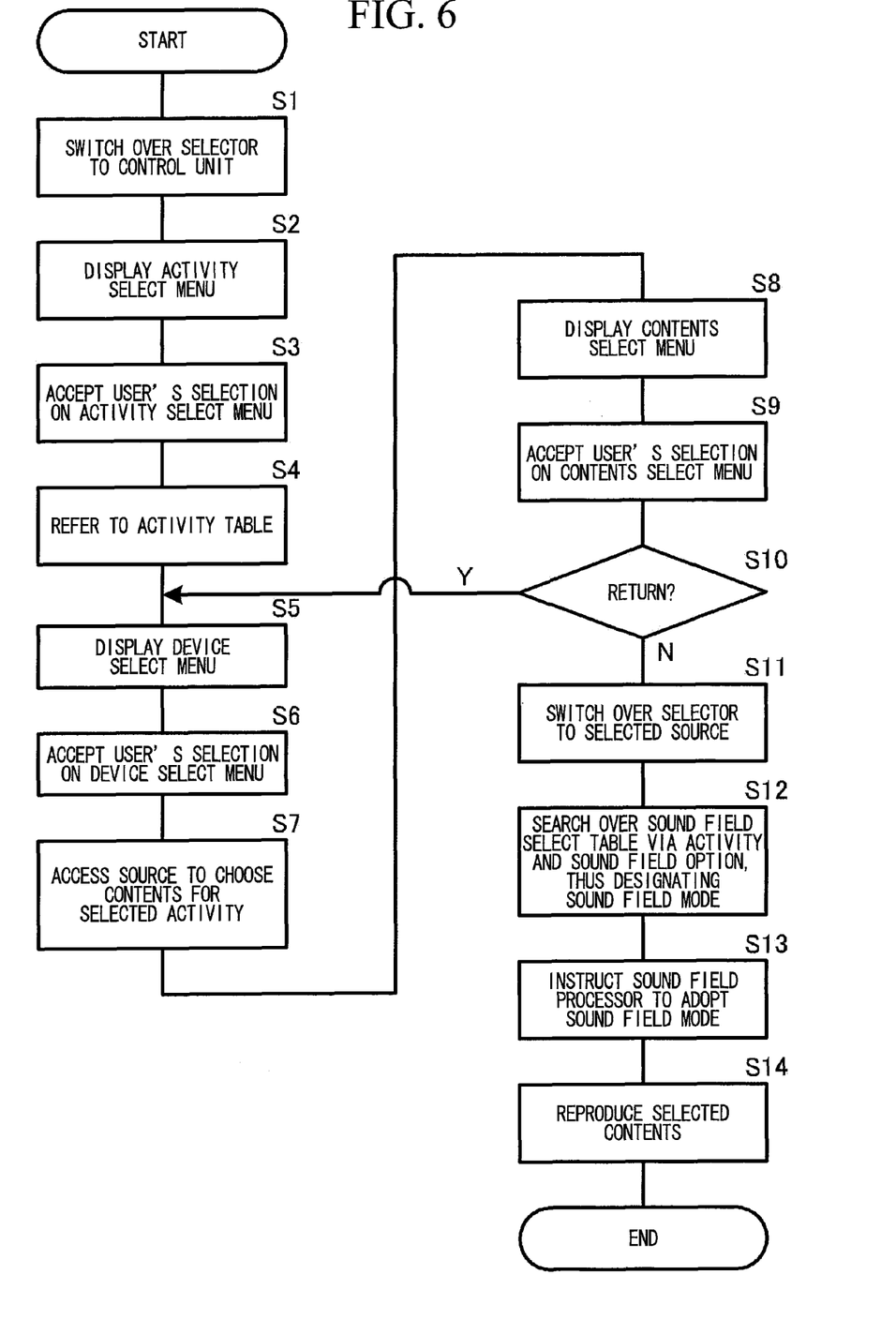
FIG. 6 is a flowchart showing a contents reproduction procedure starting reproducing selected contents in a desired sound field.
Figure 7A:
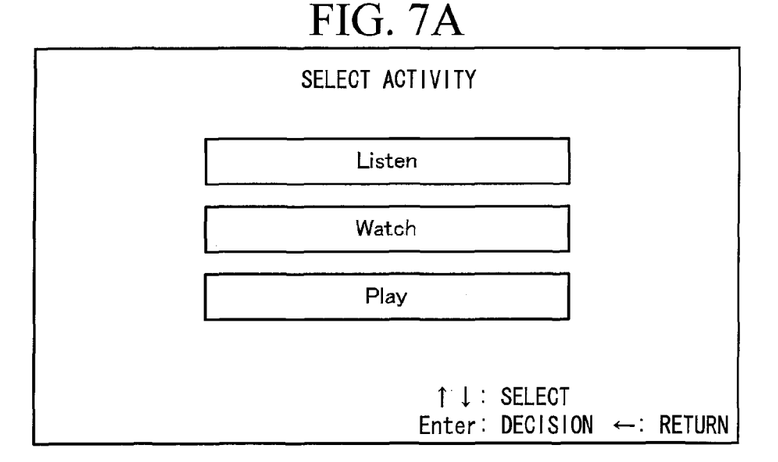
FIG. 7A shows an activity select menu displayed on a TV connected to the AV receiver.
Figure 7B:
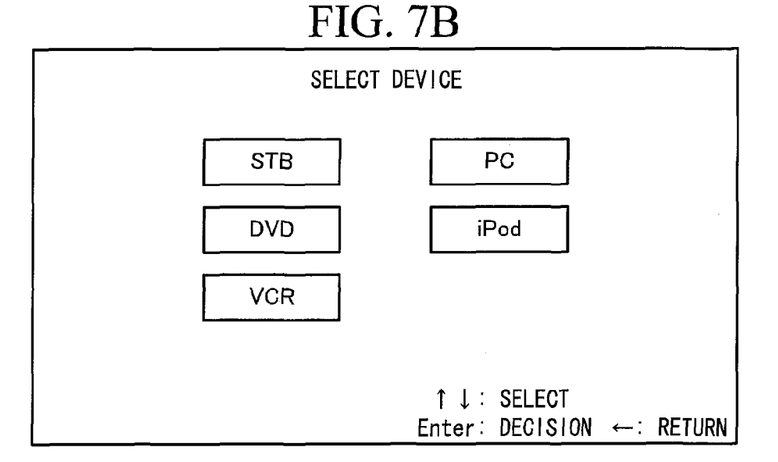
FIG. 7B shows a device select menu displayed on the TV.
Figure 7C:
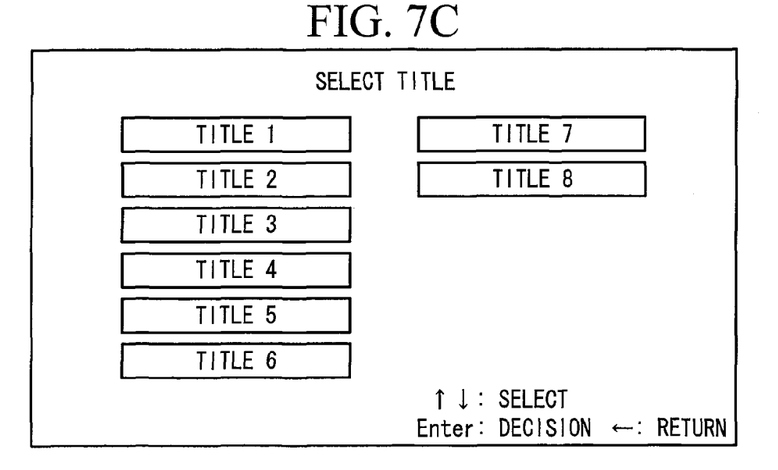
FIG. 7C shows a contents select menu displayed on the TV.

FIG. 6 is a flowchart showing a contents reproduction procedure executed via the control unit 10 of the AV receiver 1. FIGS. 7A, 7B, and 7C show examples of OSD screens displayed on the TV 3.

When the user selects contents with the AV receiver 1, the control unit 10 switches over the selector 14 (step S1), thus enabling the TV 3 to selectively display the OSD screens of FIGS. 7A to 7C. First, an activity select menu shown in FIG. 7A is displayed on the TV 3 (step S2). The control unit 10 is ready to accept the user's selection on the activity select menu (step S3). When the user selects one of activities (i.e. Listen, Watch, and Play), the control unit 10 refers to the activity table of FIG. 3 so as to choose the sources 2 reproducible in terms of the selected activity (step S4). Subsequently, the control unit 10 displays a device select menu shown in FIG. 7B allowing the user to select one of the sources 2 reproducible in terms of the selected activity on the TV 3 (step S5).

The control unit 10 is ready to accept the user's selection on the device select menu (step S6). When the user selects one of the sources 2 (e.g. STB, DVD, VCR, PC, iPod) on the device select menu, the control unit 10 accesses the selected source 2 so as to choose the preferred contents reproducible in the selected source 2 in correspondence with the selected activity (step S7).

The control unit 10 chooses the preferred contents from the storage such as the USB memory in such a way that the control unit 10 accesses the storage via the peripheral interface 16 so as to confirm files stored in the storage, thus choosing the preferred contents from the stored files in correspondence with the selected activity. In addition, the control unit 10 chooses the preferred contents from an intelligent device such as the iPod 26 in such a way that the control unit 10 requests the intelligence device to present a list of contents corresponding to the selected activity via the peripheral interface 16, thus retrieving the preferred contents from the list of contents.

The control unit 10 displays a contents select menu shown in FIG. 7C on the TV 3 (step S8). The control unit 10 is ready to accept the user's selection on the contents select menu (step S9). When the user selects one of the contents (e.g. "Title 1" to "Title 8") on the contents select menu, the control unit 10 switches over the selector 14 to be connected with the selected source 2 (step S11). The control unit 10 searches over the sound field select table of FIG. 4 in correspondence with the selected sound field option and the selected activity (see step S3), thus determining an optimum sound field mode (step S12). The control unit 10 instructs the audio signal processing unit 30 (or the sound field processor 30A) to adopt the sound field mode (step S13). Subsequently, the AV receiver 1 starts to reproduce the selected contents (step S14). Herein, the AV receiver 1 does not necessarily start reproducing the selected contents by automatically decoding MPEG files, for example, but the AV receiver 1 may instruct the source 2 to stars reproducing the selected contents. In the case of the STB 21 and the tuner 18 which normally receive and reproduce broadcast signals, it is possible to omit step S14 from the flowchart of FIG. 6.

When the user operates a "RETURN" button on the contents select menu of FIG. 7C in step S9 (see step S10), the flow proceeds back to step S5 in which the device select menu of FIG. 7B is displayed on the TV 3.

Figure 8A:
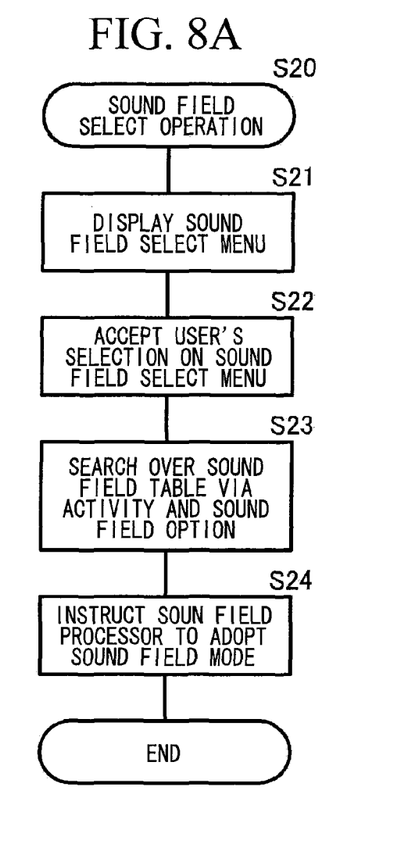
FIG. 8A is a flowchart showing a sound field selecting procedure allowing the user to arbitrarily select a desired sound field.

FIG. 8A is a flowchart showing a sound field selecting procedure allowing the user to arbitrarily select a desired sound field. When the user operates the AV receiver 1 to select a desired sound field (step S20), the control unit 10 displays a sound field select menu of FIG. 8B on the TV 3 (step S21). The sound field select menu showing sound field options (i.e.

Figure 8B:
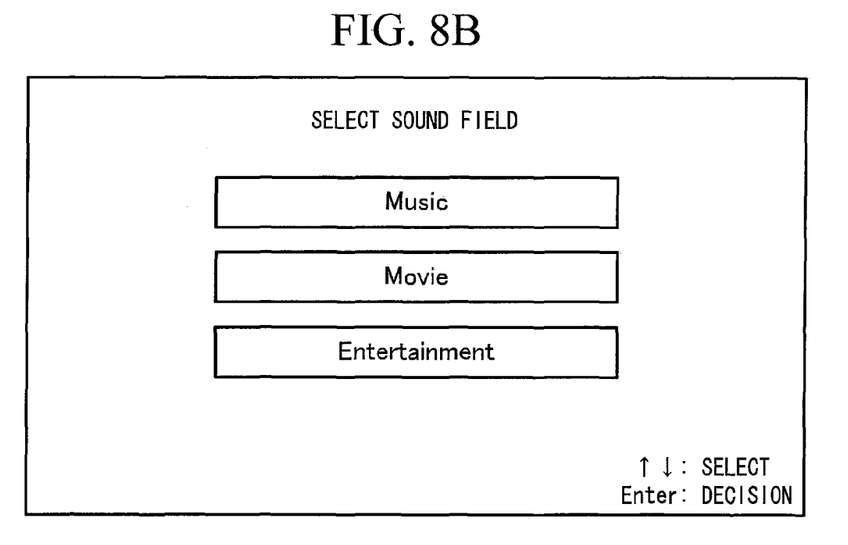
FIG. 8B shows a sound field select menu displayed on the TV.

Music, Movie, Entertainment) is superimposed on the OSD screen regarding the presently reproduced contents. The control unit 10 is ready to accept the user's selection on the sound field selection menu (step S22). When the user selects one of the sound field options on the sound field select menu, the control unit 10 searches over the sound field select table of FIG. 4 in correspondence with the selected sound field option and the reproduced activity, thus determining a preferred sound field mode (step S23). The control unit 10 instructs the sound field processor 30A of the audio signal processing unit 30 to adopt the sound field mode (step S24). When no contents are presently reproduced, the flow does not need to proceed to steps S23 and S24; hence, the selected sound field mode (see step S22) is stored in the register.

The present embodiment is directed to the AV receiver 1 as an example of the contents reproduction apparatus, which is not necessarily limited to the AV receiver 1. The present embodiment employs three types of activities (i.e. Watch, Listen, Play), whereas the classification of the contents is not necessarily limited to them.

The present embodiment is designed to allow the user to select a desired activity, thus narrowing down the source and contents. Instead, the present embodiment can be redesigned to allow the user to directly designate the preferred source and contents. In this case, the activity (or the type of contents) is detected based on the designated source and contents, so that the preferred sound field mode is determined based on the type of contents and the selected sound field option.

The sound field options are not necessarily limited to the three types of sound field options (i.e. Music, Movie, Entertainment). The sound field options are based on the types of audio signals subjected to reproduction, whereas they may represent the user (or listener) preference such as the sensations of brightness, warmness, and brilliantness.

The signal processing is not necessarily performed on audio signals but on video signals, and the signal processing is not necessarily limited to the sound field processing and is adaptable to the effect processing and equalization, for example.

Lastly, the present invention is not necessarily limited to the present embodiment, which can be further modified in various ways within the scope of the invention as defined by the appended claims.

What is claimed is:

1. A content reproduction apparatus comprising:
an activity selecting part which selects a desired activity from among a plurality of activities including a plurality of sources;
a source selecting part which selects a desired source for the activity selected by the activity selecting part;
a sound-field category selecting part which selects a desired sound-field category from among a plurality of sound-field categories including a plurality of sound-field modes;
a sound-field determining part which determines a desired sound-field mode for the desired activity and the desired sound-field category with reference to a table describing the plurality of sound-field modes combining the plurality of activities and the plurality of sound-field categories;
a content selecting part which selects a desired content from among a plurality of contents in response to the desired source; and
a signal processing part which performs signal processing on the desired content in the desired sound-field mode.

2. The content reproduction apparatus according to claim 1, wherein the activity selecting part allows a user to select the desired activity in association with an activity select menu, while the sound-field category selecting part allows the user to select the desired sound-field category in association with a sound-field category menu.

3. The content reproduction apparatus according to claim 1, wherein the plurality of activities represents Listen, Watch, and Play, while the plurality of sound-field categories represents Music, Movie, and Entertainment.

* * * * *